United States Patent
Chatroux et al.

(10) Patent No.: US 10,737,194 B2
(45) Date of Patent: Aug. 11, 2020

(54) DEVICE FOR CONVERTING A LIQUID INTO VAPOUR

(71) Applicant: COMMISSARIAT A L'ENERGIE ATOMIQUE ET AUX ENERGIES ALTERNATIVES, Paris (FR)

(72) Inventors: André Chatroux, Tullins (FR); Pascal Giroud, Saint Martin d'uriage (FR); Georges Gousseau, Moirans (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 262 days.

(21) Appl. No.: 15/757,875

(22) PCT Filed: Aug. 30, 2016

(86) PCT No.: PCT/FR2016/052140
§ 371 (c)(1),
(2) Date: Mar. 6, 2018

(87) PCT Pub. No.: WO2017/042449
PCT Pub. Date: Mar. 16, 2017

(65) Prior Publication Data
US 2019/0344192 A1  Nov. 14, 2019

(30) Foreign Application Priority Data
Sep. 7, 2015  (FR) ...................................... 15 58290

(51) Int. Cl.
*B01B 1/00* (2006.01)
*C25B 1/04* (2006.01)
(Continued)

(52) U.S. Cl.
CPC ............... *B01B 1/005* (2013.01); *C25B 1/04* (2013.01); *C25B 15/08* (2013.01); *F16K 17/16* (2013.01); *F22B 3/04* (2013.01); *F22B 37/446* (2013.01)

(58) Field of Classification Search
CPC ........................................................ B10B 1/005
See application file for complete search history.

(56) References Cited

U.S. PATENT DOCUMENTS 1,522,474 A * 1/1925 Horstkotte ................ F24D 1/00
236/32
3,187,160 A * 6/1965 Williams ................. F22B 1/30
392/327
(Continued)

FOREIGN PATENT DOCUMENTS

CN      2158515 Y    3/1994
GB       915826 A    1/1963

OTHER PUBLICATIONS

International Search Report issued in PCT Patent Application No. PCT/FR2016/052140 dated Oct. 28, 2016.
(Continued)

*Primary Examiner* — Nathaniel Herzfeld
(74) *Attorney, Agent, or Firm* — Marshall, Gerstein & Borun LLP

(57) ABSTRACT

A liquid-to-vapor conversion device includes a chamber having an opening connected to a liquid intake, a pressure relief opening, and a vapor outlet. The device also includes a flow controller arranged at the level of the liquid intake, and a burst disk installed at the level of the pressure relief opening. Further, the device includes pressure-limiting means arranged at the level of the liquid intake. The pressure-limiting means is configured to decrease the flow rate in the liquid intake when the pressure in the liquid intake
(Continued)

exceeds a threshold value smaller than a bursting pressure of the burst disk.

9 Claims, 1 Drawing Sheet

(51) Int. Cl.
    *C25B 15/08*     (2006.01)
    *F16K 17/16*     (2006.01)
    *F22B 3/04*     (2006.01)
    *F22B 37/44*     (2006.01)

(56) References Cited

U.S. PATENT DOCUMENTS

| | | | | |
|---|---|---|---|---|
| 3,488,474 | A * | 1/1970 | Saunders | F22B 1/30 392/328 |
| 3,736,235 | A | 5/1973 | Sundquist | |
| 3,776,251 | A | 12/1973 | Trubman | |
| 4,221,955 | A * | 9/1980 | Joslyn | F22B 1/30 338/86 |
| 4,430,555 | A * | 2/1984 | Stokes | F22B 1/30 122/4 A |
| 5,363,471 | A * | 11/1994 | Jones | F22B 1/30 219/483 |
| 6,553,948 | B1 * | 4/2003 | Luo | F24H 1/0009 122/18.1 |
| 2002/0020363 | A1 * | 2/2002 | Stivers | C10J 3/08 122/412 |
| 2002/0102182 | A1 | 8/2002 | Suddath et al. | |
| 2004/0138615 | A1 * | 7/2004 | Lombardi | A61B 90/00 604/118 |
| 2009/0107477 | A1 * | 4/2009 | Frock | A21B 3/04 126/20.2 |

OTHER PUBLICATIONS

International Preliminary Report on Patentability issued in PCT Patent Application No. PCT/FR/2016/052140 dated Jun. 20, 2017.

* cited by examiner

DEVICE FOR CONVERTING A LIQUID INTO VAPOUR

TECHNICAL FIELD

The present disclosure relates to the field of vapor generators, and particularly to vapor generators used in high temperature steam electrolyzers (HTSE).

More particularly, the disclosure relates to the prevention of overpressures in a device for converting a liquid into vapor operating at constant pressure, particularly the atmospheric pressure or under a few tens of bars.

BACKGROUND

A high temperature steam electrolyzer (HTSE) is an electrochemical device for generating hydrogen from steam by application of an electric current to a stack of electrolytic cells electrically connected in series and each formed of two electrodes, that is, a cathode and an anode, interposing a solid oxide electrolytic membrane. Generally, steam is introduced at the cathode of each cell powered with electricity, and a reaction of electrochemical reduction of the steam results in the forming of hydrogen on the cathode.

Generally, for a given operating point of the electrolyzer, there exists an electric current to be applied thereto, and the steam or vapor flow to be introduced into the electrolyzer is calculated according to the intensity of the electric current applied to the electrolyzer. Since the current intensity may generally vary from 0 to 100% of the operating range of the electrolyzer, the vapor flow to be generated should also be able to linearly vary from 0 to 100% of the capacity, should only be made of vapor.

Further, an electrolyzer is a system very sensitive to current/gas flow inhomogeneities, such inhomogeneities being indeed capable of causing a premature aging of the electrolyzer. For example, if the vapor flow rate varies around its set point value, an instability of the operating point of the electrolyzer can be observed, resulting in variations of the cell voltage, which is a cause of premature aging. Worse, strong variations of the vapor flow rate result in variations of the pressure by a few tens or hundreds of millibars, which may be sufficient to damage the seals or even crack the electrochemical cells. A vapor flow rate which is as homogeneous and regular as possible is thus desired.

Vapor generation devices generally comprise a heated evaporation surface, having a liquid deposited thereon to generate the evaporation of the liquid. When vapor is generated in a closed chamber, it is necessary to provide a security against overpressures in a device for converting a liquid into vapor operating at constant pressure, particularly at the atmospheric pressure or under a few tens of bars. The security against overpressures enables to limit the risk of explosion of the closed chamber.

In France, the regulations on evaporation devices comprises rules published in the form of a unified technical document (DTU: Document Technique Unifié). Such rules are generally identical in all countries. They are based on the experience of boiler makers and impose the presence of a pressure security element (pressure relief valve or burst disk) installed in an area of the chamber always filled with vapor. Similarly, the rules recommend the installation of pressure measurement equipment (manometer or pressure sensor) in the upper portion of the device.

On conventional boilers containing a liquid water phase in its lower portion and a vapor phase in its upper portion, such a security element or such a pressure measurement equipment should be oversized to operate at the vapor temperature, but they are not necessarily heat-insulated and may form cold spots, which are sources of condensation inside of the device. This is not a problem since the water drops which condensate will fall and mix with the liquid phase already present at the bottom of the device, with no further consequences. This is for example the solution applied in document CN 2,158,515 which integrates a valve in its upper portion.

In the specific case of the system for converting liquid into vapor used in high temperature steam electrolyzers, having as one of its main objects a great pressure stability, it is not acceptable for water drops to condensate on cold spots and to fall at the bottom of the device. They would cause variations of the pressure and of the vapor flow rate due to the nearly instantaneous vaporization of each drop on the very hot floor of the device.

According to an embodiment complying with regulations relative to evaporation devices, it is possible to install a valve and a pressure sensor, making sure to heat-insulate them and to heat them so that they are maintained at a temperature higher than the condensation temperature of the vapor at the considered operating pressure of the device. This requires using a valve and a pressure sensor capable of operating at a temperature in the range from 200 to 300° C., and thus equipment relatively complex to be manufactured and used. The manufacturing and installation cost of such a solution is thus increased.

According to another embodiment complying with regulations relative to evaporation devices, it can be envisaged to install a burst disk and a pressure sensor capable of operating at a temperature in the range from 200 to 300° C., making sure to heat-insulate them. This solution is advantageous from an economical viewpoint, since the burst disk has a low cost. However, the burst disk requires more human action and outages of the vapor device, since it should be replaced each time it has been used. Indeed, it destroys after its operation since it comprises a metal membrane which breaks when the bursting pressure is reached. There thus will be a higher intervention cost than with a valve. Similarly, the pressure sensor should operate between 200 and 300° C., which induces a high complexity and cost.

When complying with regulations relative to evaporation devices, there is not cost-effective solution, that is, only based on low cost components, which allows the pressure measurement and security of a device while limiting the device outage time and reactivation interventions.

The technical problem solved by the embodiments described below is to limit the operating temperature and the maintenance of an evaporation device complying with regulations.

SUMMARY OF THE DISCLOSURE

The present disclosure provides solving this technical problem by means of a burst disk protected by pressure-limiting means installed on a liquid intake of the device.

To achieve this, the disclosed embodiments relate to a device for converting a liquid into vapor comprising:
a chamber provided with an opening connected to a liquid intake, with a pressure relief opening, and with a vapor outlet,
a flow controller arranged at the level of the liquid intake,
a burst disk installed at the level of the pressure relief opening, and pressure-limiting means arranged at the level of the liquid intake, said pressure-limiting means being configured to decrease the flow rate in the liquid intake when the pressure in the liquid intake exceeds a threshold value smaller than a bursting pressure of the burst disk.

The disclosed embodiments thus enable implementation of a security against overpressures with two levels:

a first conventional level is formed by a burst disk, and a second level is formed by decrease in the liquid flow rate followed by a discharge of the excess vapor at the level of the liquid intake.

The first security level enables to comply with regulations relative to devices for converting a liquid into vapor. It is calibrated at the maximum pressure admissible by the device in accordance with regulations.

The second security level is not envisaged offhand by those skilled in the art since it does not comply with regulations. The second security level is provided to be triggered at a pressure lower than the maximum pressure admissible by the device and has the advantage of operating at room temperature.

The use of a valve and/or of a pressure sensor implanted at the level of the liquid intake thus does not require using equipment complex to manufacture and to use. Thus, standardized equipment may be used. Indeed, the liquid intake is filled with incompressible fluid which transmits the overpressure from the chamber into the liquid intake. Thus, since this liquid intake is short and horizontal, the pressure at the connection of the sensor and/or of the valve is equal to the inner pressure of the device for converting a liquid into vapor.

According to an embodiment, the pressure-limiting means comprise a pressure sensor, the flow controller being configured to stop the liquid flow injected into the liquid intake when a pressure measured by the pressure sensor exceeds a threshold value. The pressure sensor enables to measure the pressure of the device at room temperature at the liquid intake with a standard pressure sensor and at a low cost.

According to an embodiment, the device also comprises heating means arranged in the chamber, the heating means being configured to stop the heating of the chamber when a pressure measured by the pressure sensor exceeds a threshold value. The security control thus stops the heating of the internal heating resistance of the device to no longer vaporize the liquid still present in the device. The thermal inertia of such heating means being very low, such a control very efficiently stops the pressure increase.

According to an embodiment, the threshold value of the pressure measured by the pressure sensor is in the range from 1% to 90% of the bursting pressure of the burst disk. This embodiment enables to anticipate the pressure increase in the device.

According to an embodiment, the device also comprises a safety vent in hydraulic communication with the pressure relief opening to channel the vapor originating from the chamber when the burst disk is open.

According to an embodiment, the chamber and at least a portion of the safety vent are covered with a thermal insulation. This embodiment enables to avoid creating cold spots. As a variation, at least a portion of the safety vent may also be heated at the level of the connection with the burst disk.

According to an embodiment, the pressure-limiting means comprise a valve connected, on the one hand, to the liquid intake and, on the other hand, to the safety vent, the valve being configured to extract part of the liquid present in the liquid intake when the pressure in the liquid intake exceeds a threshold value. In case of an overpressure causing an opening of the valve, the vapor present in the volume of the chamber will push the liquid present in the liquid intake until it is totally emptied. Then only will the vapor be able to come out through the valve. One of the advantages of this solution precisely is to empty the liquid intake in case of an overpressure, and thus to prevent liquid, which would have contributed to further increasing the pressure, from entering into the device.

According to an embodiment, the valve opening threshold value is in the range from 80% to 95% of the bursting pressure of the burst disk.

According to an embodiment, the pressure relief opening is arranged at the level of an upper wall of the enclosure.

According to an embodiment, the pressure relief opening is arranged at the level of a duct connecting the enclosure to the vapor outlet.

BRIEF DESCRIPTION OF THE FIGURES

The presently disclosed embodiments will be better understood on reading of the following description provided as an example only in relation with the accompanying drawings, where the same reference numerals designate the same or similar elements, among which.

DETAILED DESCRIPTION

Figure 1:
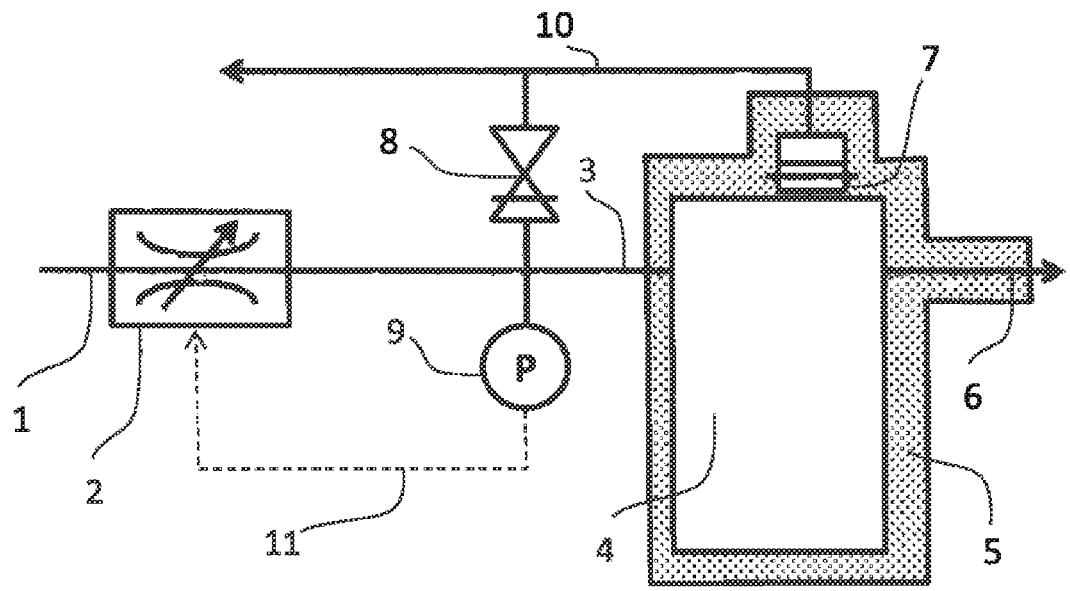
FIG. 1 is a simplified representation of the pressure security systems installed on a device for converting a liquid into vapor according to a first embodiment, where the burst disk is installed on the body of the device.

FIG. 1 illustrates a device for converting a liquid into vapor comprising a chamber 4 provided with a vapor outlet 6 and with a liquid intake 3, preferably horizontal, coupled with a conventional flow controller 2, itself supplied from a liquid intake 1. Flow controller 2 may be a commercial controller, for example, a thermal mass flow or Coriolis controller. Chamber 4 contains different elements ensuring the conversion of liquid into vapor, for example, a helix having a wire heating electric resistor with a round cross-section, used a heating means, inserted therein. A thermally insulating jacket 5 is arranged on the wall of the device to avoid cold spots. Preferably, envelope 5 and vapor outlet 6 are maintained at a temperature much higher than the liquid boiling temperature. For example, insulating jacket 5 and vapor outlet 6 are maintained at a 200° C. temperature.

To comply with regulations, a burst disk 7 is installed on the body of the device at the level of a pressure relief opening. For example, burst disk 7 is designed to open at a 500-mbar pressure and for a 200° C. operating temperature. Its diameter is at least equal to the diameter of vapor outlet line 6.

The pressure relief opening is connected to a safety vent 10 having the function of channeling the vapor in the case where burst disk 7 has burst. To avoid any cold spot at the level of burst disk 7, a thermal insulation is provided, encompassing a portion of vent line 10.

A valve 8 is set to operate at room temperature and to open at a pressure lower than the bursting pressure of burst disk 7. For example, valve 8 is set to open at a 450-mbar pressure. Valve 8 is connected on one side to liquid intake line 3 and on the other side to safety vent 10, having the function of channeling the liquid and the vapor in case of an opening of valve 8.

The liquid contained in line 3 being incompressible, it transmits the vapor pressure from chamber 4 to valve 8, which opens 50 mbars below the bursting pressure of burst disk 7. Since valve 8 protects burst disk 7, this strongly limits interventions for the replacement thereof, which is advantageous in an industrial use. Placing valve 8 on liquid intake line 3 has another advantage: the line is thus drained in case of an opening of valve 8. Knowing that the volume increase resulting from the passing from the liquid state to vapor is very significant (by a factor 1,700 for a water-to-vapor phase change), it is very useful to prevent for additional liquid to enter into the device in case of an overpressure, since this would cause a new pressure increase.

A pressure sensor 9 enables to perform a measurement of a pressure P. For example, pressure sensor 9 enables to perform measurements in the range from 0 to 500 mbar at room temperature. Pressure sensor 9 is installed on liquid intake line 3, and since the liquid contained in line 3 is incompressible, the vapor pressure of chamber 4 is transmitted to pressure sensor 9. In an electronic unit, not shown, pressure value P measured by sensor 9 is compared with an adjustable threshold between 50 mbar and 450 mbar and, if pressure P exceeds this threshold, a closed loop control stops the sending of liquid by controller 2 and cuts off the electric power on the inner evaporation surface of the device.

In the first embodiment illustrated in FIG. 1, the pressure relief opening containing burst disk 7 is arranged at the level of an upper wall of chamber 4.

Figure 2:
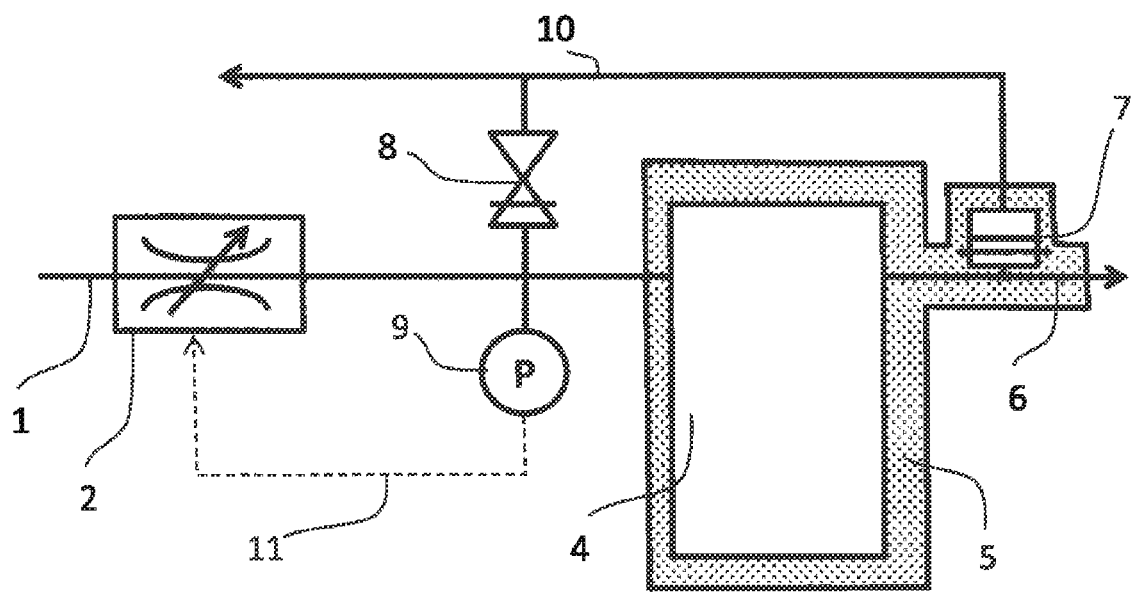
FIG. 2 is a simplified representation of the pressure security systems installed on a device for converting a liquid into vapor according to a second embodiment, where the burst disk is installed on vapor outlet line the device.

According to a second embodiment illustrated in FIG. 2, the pressure relief opening is arranged on vapor outlet line 6. According to regulations, since the vapor outlet piping is connected to the upper portion of the device, burst disk 7 placed on this piping is considered as "directly placed in the upper portion of the device" and complies with the recommendations of regulations.

The embodiments described in reference with FIGS. 1 and 2 have three security levels enabling to prevent any overpressure:

a required level with a burst disk 7;

an adjustable level protecting the equipment downstream of chamber 4, formed by sensor 9 and a closed loop control of flow controller 2; and a fixed level comprising a valve 8 protecting burst disk 7 and emptying liquid intake line 3.

The embodiments thus enable one to efficiently prevent overpressures while limiting the complexity, and thus the cost, of the elements used. Indeed, the elements arranged on the liquid intake line 3 operate at room temperature rather than at high temperature, and the use of a burst disk 7 is more cost-effective than the use of a valve at the level of enclosure 4.

The embodiments thus enable one to limit device outage times and corrective maintenance interventions due to the three security levels, among which only burst disk 7 requires a manual corrective intervention.

The invention claimed is:

1. A device for converting a liquid into vapor, comprising:
a chamber provided with an opening connected to a liquid intake, with a pressure relief opening, and with a vapor outlet,
a flow controller arranged at the level of the liquid intake and configured to control the liquid flow in the liquid intake, and
a first pressure-limiting means comprising a burst disk installed at the level of the pressure relief opening,
wherein the device also comprises a second pressure-limiting means arranged at the level of the liquid intake including said flow controller and a pressure sensor, said second pressure-limiting means being configured to decrease the flow rate in the liquid intake when the pressure in the liquid intake exceeds a first threshold value smaller than a bursting pressure of the burst disk, the flow controller being configured to stop the liquid flow injected into the liquid intake when a pressure measured by the pressure sensor exceeds said first threshold value.

2. The liquid-to-vapor conversion device of claim 1, wherein the device also comprises a heating element arranged in the chamber, said heating element being configured to stop the heating of the chamber when a pressure measured by the pressure sensor exceeds said first threshold value.

3. The liquid-to-vapor conversion device of claim 1, wherein the first threshold value of the pressure measured by the pressure sensor is in the range from 1% to 90% of the bursting pressure of the burst disk.

4. The liquid-to-vapor conversion device of claim 1, further comprising a safety vent in hydraulic communication with the pressure relief opening to channel the vapor originating from the chamber when the burst disk is open.

5. The liquid-to-vapor conversion device of claim 4, wherein the chamber and at least a portion of the safety vent are covered with a thermal insulation.

6. The liquid-to-vapor conversion device of claim 4, wherein the device also comprises a third pressure-limiting means comprising a valve connected on the one hand to the liquid intake and on the other hand to the safety vent, the valve being configured to extract part of the liquid present in the liquid intake when the pressure in the liquid intake exceeds a second threshold value.

7. The liquid-to-vapor conversion device of claim 6, wherein the second threshold value for opening the valve is in the range from 80% to 95% of the bursting pressure of the burst disk.

8. The liquid-to-vapor conversion device of claim 1, wherein the pressure relief opening is arranged at the level of an upper wall of the chamber.

9. The liquid-to-vapor conversion device of claim 1, wherein the pressure relief opening is arranged at the level of a duct connecting the chamber to the vapor outlet.

* * * * *